(12) United States Patent
Takeuchi

(10) Patent No.: US 10,140,077 B2
(45) Date of Patent: Nov. 27, 2018

(54) IMAGE PROCESSING APPARATUS, PROCESSING METHOD, AND STORAGE MEDIUM STORING PROGRAM HAVING WIRELESS COMMUNICATION WITH A NONCONTACT STORAGE MEDIUM

(71) Applicant: BROTHER KOGYO KABUSHIKI KAISHA, Nagoya-shi, Aichi-ken (JP)

(72) Inventor: Masahide Takeuchi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/711,082

(22) Filed: Sep. 21, 2017

(65) Prior Publication Data

US 2018/0107438 A1    Apr. 19, 2018

(30) Foreign Application Priority Data

Oct. 18, 2016    (JP) ................................ 2016-204672

(51) Int. Cl.
*H04N 1/00* (2006.01)
*G06F 3/12* (2006.01)
(Continued)

(52) U.S. Cl.
CPC ........ *G06F 3/1298* (2013.01); *G06F 21/6218* (2013.01); *H04L 63/20* (2013.01); *H04N 1/00416* (2013.01); *G06F 17/30221* (2013.01)

(58) Field of Classification Search
None
See application file for complete search history.

(56) References Cited

U.S. PATENT DOCUMENTS 8,505,089 B2 * 8/2013 Maeda ............... H04N 1/00474
                                                    713/155
9,760,274 B2 * 9/2017 Suzuki .................. G06F 3/0487
(Continued)

FOREIGN PATENT DOCUMENTS

JP         4874937 B2    2/2012
JP       2015-007845 A   1/2015
JP       2015-041795 A   3/2015

*Primary Examiner* — Barbara Reinier
(74) *Attorney, Agent, or Firm* — Scully, Scott, Murphy & Presser, PC

(57) ABSTRACT

An image processing apparatus performs: in a case where an operating mode is a second mode when identification information receiving process is executed, determining whether a first memory stores first identification information corresponding to second identification information; in response to determining that the first memory stores the first identification information, determining whether a second memory stores third identification information corresponding to the second identification information; in response to determining that the second memory stores the third identification information, determining whether a first screen is displayed; in response to determining that the first screen is displayed, executing a first logout process of switching the operating mode from the second mode to the first mode and deleting the third identification information stored in the second memory; in response to determining that the first screen is not displayed, maintaining the operating mode in the second mode without executing the first logout process.

20 Claims, 7 Drawing Sheets

(51) Int. Cl.
*G06F 21/62* (2013.01)
*H04L 29/06* (2006.01)
*G06F 17/30* (2006.01)

(56) References Cited

U.S. PATENT DOCUMENTS

| | | | |
|---|---|---|---|
| 2010/0002250 A1* | 1/2010 | Sakagami | H04N 1/0035 358/1.14 |
| 2012/0167201 A1* | 6/2012 | Maeda | H04N 1/00474 726/17 |
| 2012/0203978 A1* | 8/2012 | Hori | G06F 21/604 711/154 |
| 2014/0085654 A1* | 3/2014 | Miyazaki | H04N 1/00209 358/1.13 |
| 2015/0055174 A1* | 2/2015 | Baba | G03G 15/502 358/1.15 |
| 2016/0119504 A1 | 4/2016 | Baba | |
| 2016/0191475 A1* | 6/2016 | Lee | H04L 63/0492 726/19 |
| 2016/0274854 A1* | 9/2016 | Tokiwa | G06F 3/1415 |

* cited by examiner

*FIG. 3*

| User ID | Card ID | Fax | Copy | Scan |
|---------|---------|-----|------|------|
| Guest | – | × | × | ○ |
| UserA | 5678 | ○ | ○ | ○ |
| UserB | 9012 | × | ○ | ○ |

IMAGE PROCESSING APPARATUS, PROCESSING METHOD, AND STORAGE MEDIUM STORING PROGRAM HAVING WIRELESS COMMUNICATION WITH A NONCONTACT STORAGE MEDIUM

CROSS REFERENCE TO RELATED APPLICATIONS

This application claims priority from Japanese Patent Application No. 2016-204672 filed Oct. 18, 2016. The entire content of the priority application is incorporated herein by reference.

TECHNICAL FIELD

This specification relates to an image processing apparatus that executes a function using image data, a processing method performed in the image processing apparatus, and a storage medium storing a program installed in a computer of the image processing apparatus.

BACKGROUND

There is a known conventional image forming apparatus such as a multi-function peripheral (MFP) that includes an IC card reader capable of wireless communication with the IC card, and reads identification information from the IC card in response to that the IC card is held over the IC card reader, to perform a predetermined operation.

SUMMARY

According to one aspect, this specification discloses an image processing apparatus. The image processing apparatus includes a first memory, a wireless communication interface, a second memory, an operating interface, a display, a processor, and a third memory. The first memory is for storing first identification information. The wireless communication interface is configured to perform wireless communication with a noncontact storage medium located within a particular distance and to receive second identification information. The second memory is for storing third identification information. The operating interface is configured to receive an operation. The third memory stores instructions, the instructions, when executed by the processor, causing the processor to perform: switching an operating mode of the image processing apparatus between: a first mode in which the image processing apparatus stands by; and a second mode in which the processor executes a first displaying process of displaying a first screen on the display, and a second displaying process of displaying a second screen different from the first screen on the display in response to receiving, by the operating interface, an operation relating to a function using image data while the first screen is being displayed; when wireless communication is performed between the noncontact storage medium and the wireless communication interface, executing an identification information receiving process of receiving the second identification information stored in the noncontact storage medium through the wireless communication interface; in a case where the operating mode is the first mode when the identification information receiving process is executed, determining whether the first memory stores the first identification information corresponding to the second identification information; in response to determining that the first memory stores the first identification information corresponding to the second identification information, storing the third identification information corresponding to the second identification information in the second memory, and executing a first login process of switching the operating mode from the first mode to the second mode; and in response to determining that the first memory does not store the first identification information corresponding to the second identification information, maintaining the operating mode in the first mode without executing the first login process; and in a case where the operating mode is the second mode when the identification information receiving process is executed, determining whether the first memory stores the first identification information corresponding to the second identification information; in response to determining that the first memory stores the first identification information corresponding to the second identification information, determining whether the second memory stores the third identification information corresponding to the second identification information; in response to determining that the second memory stores the third identification information corresponding to the second identification information, determining whether the first screen is displayed on the display; in response to determining that the first screen is displayed on the display, executing a first logout process of switching the operating mode from the second mode to the first mode and deleting the third identification information stored in the second memory; in response to determining that the first screen is not displayed on the display, maintaining the operating mode in the second mode without executing the first logout process; in response to determining that the second memory does not store the third identification information corresponding to the second identification information, executing a second login process of storing the third identification information corresponding to the second identification information in the second memory; and in response to determining that the first memory does not store the first identification information corresponding to the second identification information, executing a second logout process of switching the operating mode from the second mode to the first mode and deleting the third identification information stored in the second memory.

According to another aspect, this specification also discloses a method executable on an image processing apparatus including: a first memory for storing first identification information; a wireless communication interface configured to perform wireless communication with a noncontact storage medium located within a particular distance and to receive second identification information; a second memory for storing third identification information; an operating interface configured to receive an operation; a display; and a processor configured to perform: switching an operating mode of the image processing apparatus between: a first mode in which the image processing apparatus stands by; and a second mode in which the processor executes a first displaying process of displaying a first screen on the display, and a second displaying process of displaying a second screen different from the first screen on the display in response to receiving, by the operating interface, an operation relating to a function using image data while the first screen is being displayed. The method includes: when wireless communication is performed between the noncontact storage medium and the wireless communication interface, executing an identification information receiving process of receiving the second identification information stored in the noncontact storage medium through the wireless communication interface; in a case where the operating mode is the first mode when the identification information receiving process is executed, determining whether the first memory stores the first identification information corresponding to the second identification information; in response to determining that the first memory stores the first identification information corresponding to the second identification information, storing the third identification information corresponding to the second identification information in the second memory, and executing a first login process of switching the operating mode from the first mode to the second mode; and in response to determining that the first memory does not store the first identification information corresponding to the second identification information, maintaining the operating mode in the first mode without executing the first login process; and in a case where the operating mode is the second mode when the identification information receiving process is executed, determining whether the first memory stores the first identification information corresponding to the second identification information; in response to determining that the first memory stores the first identification information corresponding to the second identification information, determining whether the second memory stores the third identification information corresponding to the second identification information; in response to determining that the second memory stores the third identification information corresponding to the second identification information, determining whether the first screen is displayed on the display; in response to determining that the first screen is displayed on the display, executing a first logout process of switching the operating mode from the second mode to the first mode and deleting the third identification information stored in the second memory; in response to determining that the first screen is not displayed on the display, maintaining the operating mode in the second mode without executing the first logout process; in response to determining that the second memory does not store the third identification information corresponding to the second identification information, executing a second login process of storing the third identification information corresponding to the second identification information in the second memory; and in response to determining that the first memory does not store the first identification information corresponding to the second identification information, executing a second logout process of switching the operating mode from the second mode to the first mode and deleting the third identification information stored in the second memory.

According to still another aspect, this specification also discloses a non-transitory computer-readable storage medium storing a set of program instructions executable by a computer of an image processing apparatus. The image processing apparatus includes: a first memory for storing first identification information; a wireless communication interface configured to perform wireless communication with a noncontact storage medium located within a particular distance and to receive second identification information; a second memory for storing third identification information; an operating interface configured to receive an operation; and a display. The set of program instructions includes: switching an operating mode of the image processing apparatus between: a first mode in which the image processing apparatus stands by; and a second mode in which the processor executes a first displaying process of displaying a first screen on the display, and a second displaying process of displaying a second screen different from the first screen on the display in response to receiving, by the operating interface, an operation relating to a function using image data while the first screen is being displayed; when wireless communication is performed between the noncontact storage medium and the wireless communication interface, executing an identification information receiving process of receiving the second identification information stored in the noncontact storage medium through the wireless communication interface; in a case where the operating mode is the first mode when the identification information receiving process is executed, determining whether the first memory stores the first identification information corresponding to the second identification information; in response to determining that the first memory stores the first identification information corresponding to the second identification information, storing the third identification information corresponding to the second identification information in the second memory, and executing a first login process of switching the operating mode from the first mode to the second mode; and in response to determining that the first memory does not store the first identification information corresponding to the second identification information, maintaining the operating mode in the first mode without executing the first login process; and in a case where the operating mode is the second mode when the identification information receiving process is executed, determining whether the first memory stores the first identification information corresponding to the second identification information; in response to determining that the first memory stores the first identification information corresponding to the second identification information, determining whether the second memory stores the third identification information corresponding to the second identification information; in response to determining that the second memory stores the third identification information corresponding to the second identification information, determining whether the first screen is displayed on the display; in response to determining that the first screen is displayed on the display, executing a first logout process of switching the operating mode from the second mode to the first mode and deleting the third identification information stored in the second memory; in response to determining that the first screen is not displayed on the display, maintaining the operating mode in the second mode without executing the first logout process; in response to determining that the second memory does not store the third identification information corresponding to the second identification information, executing a second login process of storing the third identification information corresponding to the second identification information in the second memory; and in response to determining that the first memory does not store the first identification information corresponding to the second identification information, executing a second logout process of switching the operating mode from the second mode to the first mode and deleting the third identification information stored in the second memory.

Here, the first memory, the second memory, and the third memory may be different memories. Alternatively, all or two of the first memory, the second memory, and the third memory may be the same memory.

BRIEF DESCRIPTION OF THE DRAWINGS

Embodiments in accordance with this disclosure will be described in detail with reference to the following figures wherein:

FIG. 3 is a diagram showing an example of a user authentication database constructed in a nonvolatile memory of the MFP;

DETAILED DESCRIPTION

A user often hangs an IC card with a string from his/her neck in order to save a burden of taking out the IC card from a pocket and not to lose the IC card. In this case, the IC card swings along with a movement of a user's body and sometimes the IC card approaches an IC card reader at an unintended timing for the user.

A conventional image forming apparatus reads identification information from an IC card to perform a predetermined operation when the IC card approaches an IC card reader, regardless of whether a user has held the IC card over the IC card reader intentionally, or the IC card approaches the IC card reader at an unintended timing for the user. This is problematic especially in an image forming apparatus that accepts an operation when a user logs in and that does not accept an operation other than login when the user logs out, and that has a function of making a logged-in user log out in response to that the IC card is held over the IC card reader.

For example, when the IC card approaches the IC card reader at an unintended timing for the user while the user is performing an operation after logging in the image forming apparatus, the image forming apparatus reads the IC card regardless of the intention of the user and makes the user log out from the image forming apparatus. As a result, the user is logged out from the image forming apparatus at an unintended timing and cannot perform the operation anymore, and this is inconvenient.

An example of an object of this disclosure is to provide an image processing apparatus, a processing method, and a storage medium storing a program, capable of suppressing an operation mode from switching from a second mode to a first mode in which the image processing apparatus stands by, at an unintended timing for a user.

An aspect of this disclosure will be described while referring to the accompanying drawings.

<Electrical Configuration of MFP>

Figure 1:
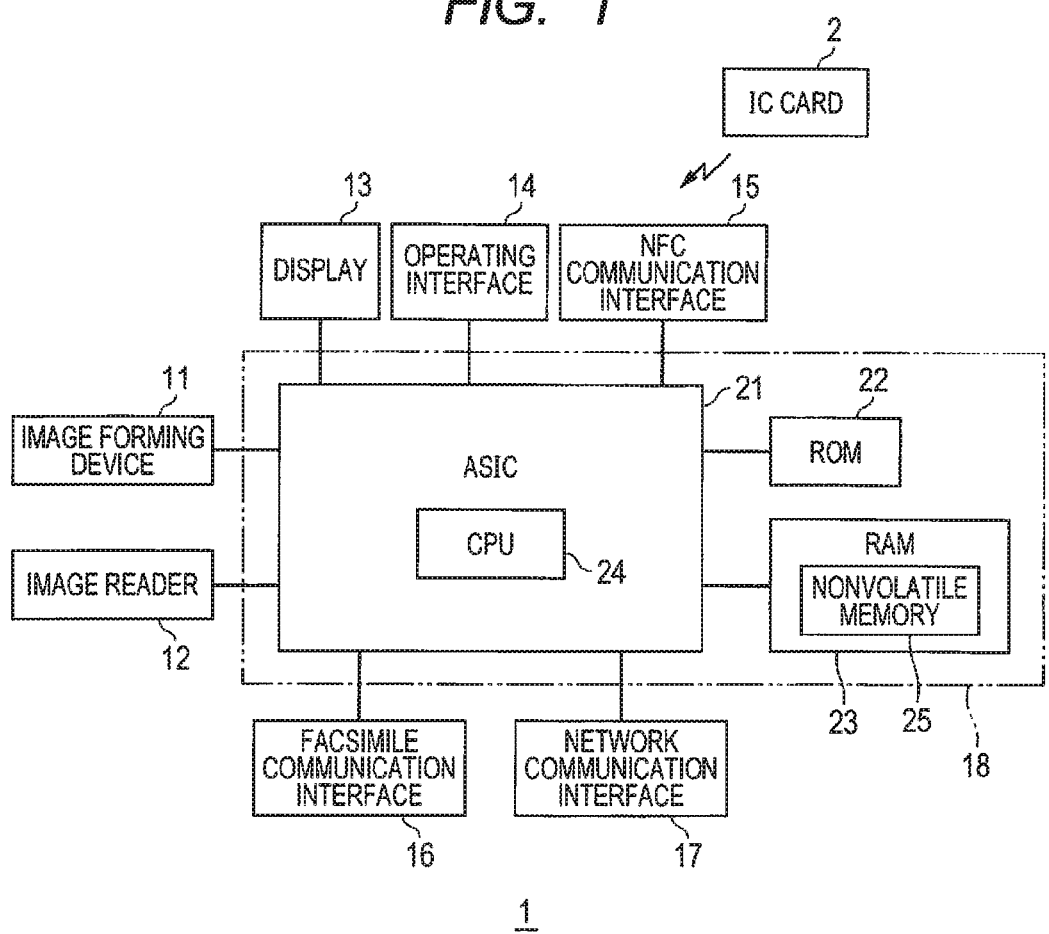
FIG. 1 is a block diagram showing an electrical configuration of an MFP according to an embodiment.

A multi-function peripheral (MFP) 1 shown in FIG. 1 is a multi-function machine having an image forming function and an image reading function. The MFP 1 (an example of an image processing apparatus) includes an image forming device 11 (an example of a function execution device and a printer) for the image forming function, and an image reader 12 (an example of the function execution device and a scanner) for the image reading function. Further, the MFP 1 includes a display 13, an operating interface 14, an NFC communication interface 15 (an example of a wireless communication interface), a facsimile communication interface 16, a network communication interface 17, and a controller 18.

The image forming device 11 forms an image (color image or monochrome image) related to image data on a sheet that is conveyed one at a time in a conveyance path in the MFP 1. A method of the image formation may be an electrographic method or may be an inkjet method.

The image reader 12 includes an image sensor, an analog front end (AFE), and so on. In the image reader 12, an image of a document is read by the image sensor, an analog image signal is outputted from the image sensor, and the analog image signal is converted to digital image data by the AFE.

The display 13 is, for example, a liquid crystal display. Various types of pieces of information are displayed on the display 13.

The operating interface 14 includes operation buttons (such as a start key, a numeric key, a cursor key, and a return button). Various types of instructions can be inputted to the operating interface 14 by operation of the operation buttons. The operating interface 14 may be a touch key provided integrally with the display 13.

The NFC communication interface 15 includes an antenna, an IC chip module, and so on for wireless communication by near field communication (NFC) with a non-contact type IC card 2 (an example of a non-contact storage medium). The NFC is a wireless communication technique conforming to ISO/IEC14443, ISO/IEC18092, and so on that are the international standards, and utilizes a communication frequency in a 13.56 MHz band. When the IC card 2 is held over (approaches) the NFC communication interface 15, an operating power is fed to the IC card 2 by electromagnetic induction and communication between the NFC communication interface 15 and the IC card 2 is executed by modulation of a carrier.

The facsimile communication interface 16 includes a modem in which a network control unit (NCU) is incorporated, and so on, for facsimile communication via a telephone network.

The network communication interface 17 includes a circuit for network communication via a local area network (LAN), and so on. The LAN may be a wired LAN and may be a wireless LAN. The LAN may include both of the wired LAN and the wireless LAN.

The controller 18 includes an application specific integrated circuit (ASIC) 21, a ROM 22, a RAM 23 (an example of a first memory and a second memory), and so on.

The ASIC 21 incorporates a CPU 24 (an example of a processor). Image data acquired by the image reader 12, an operation signal representing an operation content of the operating interface 14, and so on are inputted to the ASIC 21. The CPU 24 executes a program stored in the ROM 22 on the basis of the signal inputted to the ASIC 21, and so on, to control the image forming device 11, the image reader 12, and the display 13 and control the NFC communication interface 15, the facsimile communication interface 16, and the network communication interface 17 for communication. When a control (program) is executed by the CPU 24, the RAM 23 is used as a work area. The RAM 23 includes a nonvolatile memory 25 (an example of the first memory) such as a nonvolatile RAM (NVRAM).

<Method of Using MFP>

In the MFP 1, a facsimile (FAX) function, a scan function, and a copy function are executed by each of independent functions of the image forming function and the image reading function, a combination of those functions, and a combination of those functions and the communication function.

The facsimile function is a function of transmitting and receiving the image data via a public telephone network. Particularly, the facsimile function includes a transmitting function of transmitting the image data acquired by the image reading function by the image reader 12 from the facsimile communication interface 16 to a counterpart of the facsimile communication, and a receiving function of forming the image data received by the facsimile communication interface 16 from a counterpart of the facsimile communication onto a sheet by the image forming function by the image forming device 11.

The scan function is a function of reading an image of a document by the image reading function by the image reader 12 and acquiring image data of the image. The image data acquired by the scan function may be transmitted from the network communication interface 17 via the LAN to a personal computer (PC). When the MFP 1 has a USB port, the image data may be stored in a USB memory connected to the USB port.

The copy function is a function of reading the image of the document by the image reading function by the image reader 12, acquiring the image data of the image, and forming the image related to the acquired image data onto a sheet by the image forming function by the image forming device 11. That is, the copy function is a function of forming an image that is identical to the image of the document onto a sheet by a combination of the image forming function and the image reading function.

The user needs to log in to the MFP 1 for performing the various types of functions.

Figure 2:
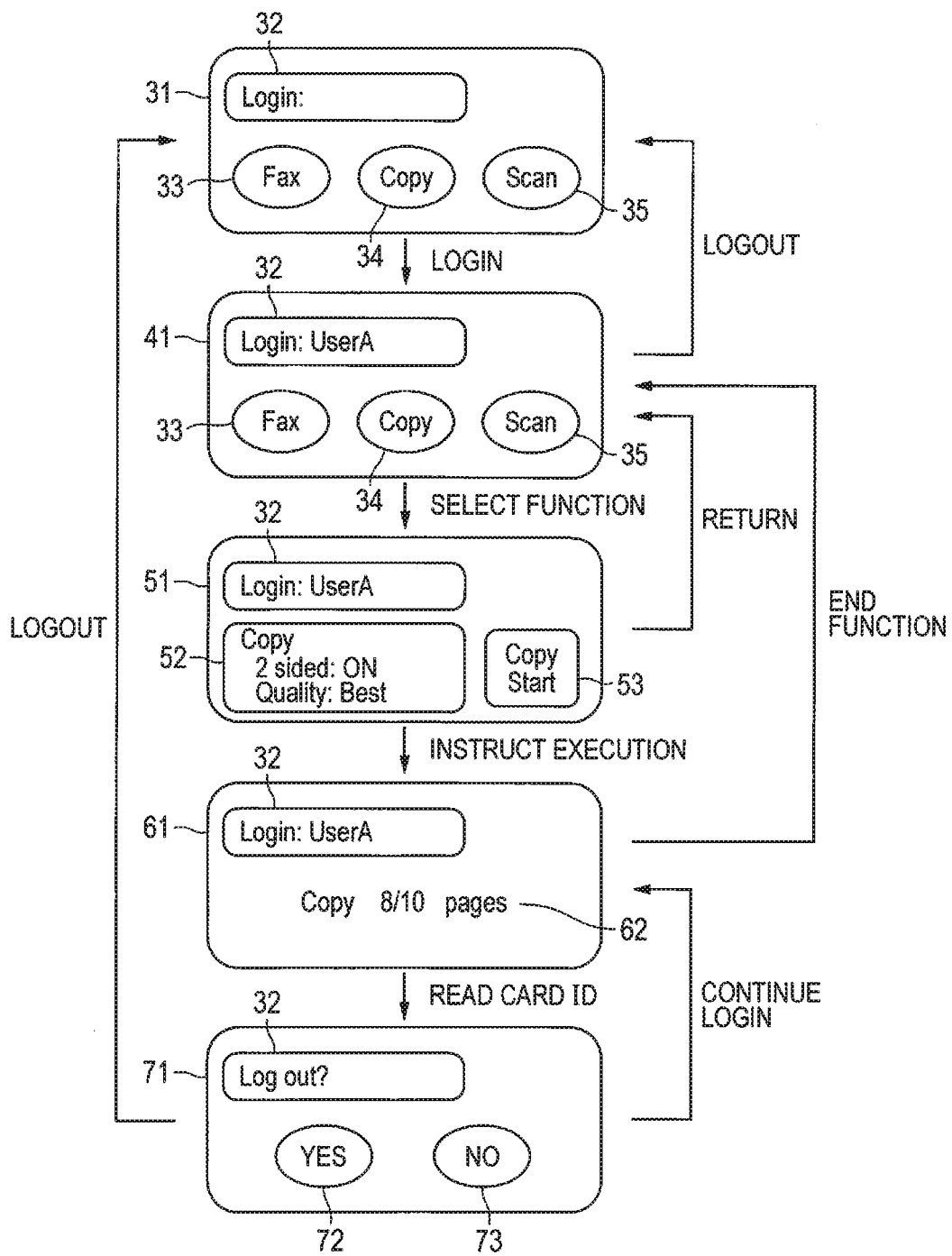
FIG. 2 is a diagram showing transition of a screen displayed on a display of the MFP.

When no user is logged in to the MFP 1, the operation mode of the MFP 1 is set to a first mode. In the first mode, the CPU 24 causes the display 13 to display a login reception screen 31 shown in FIG. 2. In the login reception screen 31, "Login:" is displayed in a message display region 32, and a user name is not displayed. The message display region 32 is set in an upper part of the login reception screen 31. In a lower part of the login reception screen 31, a facsimile selection button 33, a copy selection button 34, and a scan selection button 35 for selecting the facsimile function, the scan function, and the copy function, respectively, are displayed. In the facsimile selection button 33, the copy selection button 34, and the scan selection button 35, for example, words of "Fax", "Copy", and "Scan" are displayed, respectively.

When the login reception screen 31 is displayed on the display 13, a user having user authority of the MFP 1 can log in to the MFP 1. The IC card 2 is used for logging in to the MFP 1 and logging out from the MFP 1. The IC card 2 incorporates an IC chip module having a configuration including a CPU and various types of memories. In the memories of the IC chip module, a card ID (an example of second identification information) that is specific to the IC card 2 is stored. When the user holds the IC card 2 over the NFC communication interface 15 and the IC card 2 enters a communication area of the NFC communication interface 15, wireless communication (NFC communication) between the IC card 2 and the NFC communication interface 15 is executed by the NFC, and a card ID is read from the IC card 2 by the NFC communication interface 15. Here, the NFC communication interface 15 (an example of a wireless communication interface) reads a card ID (an example of second identification information) from the IC card 2 (an example of a noncontact storage medium). Alternatively, the IC card 2 may write a card ID in the NFC communication interface 15. The term "receive second identification information from the noncontact storage medium" includes the both cases.

In the nonvolatile memory 25 (see FIG. 1) included in the RAM 23, a user authentication database is constructed (stored). In the user authentication database, as shown in FIG. 3, a user ID (an example of first identification information) of a user having use authority of the MFP 1 is stored (registered). In the user authentication database, the card ID of the IC card 2 owned by the user and a function that can be executed by the user (executable function) is stored in association with each user ID.

In an example shown in FIG. 3, a user ID "UserA" of a user A and a user ID "UserB" of a user B, having use authority of the MFP 1 are stored in the nonvolatile memory 25. In the nonvolatile memory 25, a card ID "5678" of the IC card 2 owned by the user A and the facsimile function, the copy function, and the scan function as the functions that can be executed by the user A, are stored in association with the user ID "UserA". In addition, in the nonvolatile memory 25, a card ID "9012" of the IC card 2 owned by the user B, and the copy function and the scan function as the functions that can be executed by the user B, are stored in association with the user ID "UserB".

When the wireless communication between the IC card 2 and the NFC communication interface 15 is performed, the CPU 24 receives the card ID stored in the IC card 2 via the NFC communication interface 15. Then, the CPU 24 determines whether the user ID corresponding to the received card ID (the card ID read from the IC card 2 by the NFC communication interface 15) is registered in the user authentication database stored in the nonvolatile memory 25.

When the user ID corresponding to the card ID is registered in the user authentication database, the user authentication is successful and the CPU 24 reads the user ID corresponding to the card ID from the user authentication database to store the user ID in the RAM 23. The CPU 24 switches the operation mode of the MFP 1 from the first mode to the second mode. Thereby, the user is logged in to the MFP 1. In the second mode, a function stored in the nonvolatile memory 25 in association with the user ID (the user ID of the logged-in user; an example of third identification information) stored in the RAM 23 can be performed in the MFP 1. On the other hand, when the user ID corresponding to the card ID is not registered in the user authentication database, the user authentication fails and the CPU 24 does not store the user ID corresponding to the card ID in the RAM 23.

In response to the login of the user (in response to switching from the first mode to the second mode), the CPU 24 switches the display of the display 13 from the login reception screen 31 to a function selection screen 41 (an example of a first screen). In the function selection screen 41, "Login:" is displayed in the message display region 32 and the user ID (for example, "UserA") of the logged-in user is displayed on the right side thereof. In the function selection screen 41, the facsimile selection button 33, the copy selection button 34, and the scan selection button 35 are displayed, continuously from the login reception screen 31.

In the function selection screen 41, the functions that can be executed by the user and the functions that cannot be executed by the user may be distinguishably displayed. For example, when the user B logs in, display colors of the copy selection button 34 for selecting the copy function and the scan selection button 35 for selecting the scan function, that can be executed by the user B may be displayed in an inverted color of a background color, and a display color of the facsimile selection button 33 for selecting the facsimile function that cannot be executed by the user B may be displayed in the same color as the background color.

When the logged-in user holds the IC card 2 of the user over the NFC communication interface 15 during the display of the function selection screen 41, the user is logged out from the MFP 1. That is, when the IC card 2 is held over the NFC communication interface 15 and wireless communication between the IC card 2 and the NFC communication interface 15 is performed, the CPU 24 receives the card ID stored in the IC card 2 via the NFC communication interface 15. Then, the CPU 24 determines whether the user ID corresponding to the received card ID is stored in the RAM 23. When the user ID corresponding to the card ID is stored in the RAM 23, the CPU 24 deletes the user ID stored in the RAM 23 and switches the operation mode of the MFP 1 from the second mode to the first mode. Thereby, the user is logged out from the MFP 1. In response to the logout of the user, the CPU 24 returns the display of the display 13 from the function selection screen 41 to the login reception screen 31.

When one of the facsimile selection button 33, the copy selection button 34, and the scan selection button 35 that correspond to the functions that can be executed by the user is selected by an operation of the operating interface 14 during the display of the function selection screen 41, the CPU 24 switches the display of the display 13 from the function selection screen 41 to a setting screen 51 (an example of a second screen). The setting screen 51 is a screen for performing a setting related to a function corresponding to the facsimile selection button 33, the copy selection button 34, or the scan selection button 35, selected by the user. In the setting screen 51, the word "Login:" and the user ID of the logged-in user are continuously displayed in the message display region 32. In the setting screen 51, a setting content is displayed in a setting content display region 52 in a lower side of the message display region 32, and a start button 53 for instructing the execution of the function is displayed in the right side of the setting content display region 52.

Even when the IC card 2 of the logged-in user is held over the NFC communication interface 15 during the display of the setting screen 51, the logged-in user is not logged out from the MFP 1. When the logged-in user wishes to log out from during the display of the setting screen 51, the user can log out from the MFP 1 by, for example, pressing a return button provided in the operating interface 14 to return the display of the display 13 from the setting screen 51 to the function selection screen 41 and then holding the IC card 2 over the NFC communication interface 15.

When the start button 53 displayed in the setting screen 51 is pressed by the operation of the operating interface 14, the CPU 24 switches the display of the display 13 from the setting screen 51 to a function-execution in-progress screen 61 (an example of a third screen). In the function-execution in-progress screen 61, the display content of the message display region 32 does not change from the setting screen 51, and a progress status of the function is displayed in a progress status display region 62 in the lower side of the message display region 32.

When the function that is being executed ends, the CPU 24 switches the display of the display 13 from the function-execution in-progress screen 61 to the function selection screen 41.

When the IC card 2 of the logged-in user is held over the NFC communication interface 15 during the display of the function-execution in-progress screen 61, that is, when, during the display of the function-execution in-progress screen 61, the CPU 24 receives the card ID from the IC card 2 via the NFC communication interface 15 and the user ID corresponding to the received card ID is stored in the RAM 23, the CPU 24 switches the display of the display 13 from the function-execution in-progress screen 61 to a logout confirmation screen 71 (an example of a fourth screen). In the logout confirmation screen 71, a message "Log out?" for confirming logout is displayed in the message display region 32 and an "YES" selection button 72 and a "NO" selection button 73 are displayed in the lower side thereof.

When the "YES" selection button 72 is pressed by the operation of the operating interface 14, the CPU 24 deletes the user ID from the RAM 23 and the logged-in user is logged out from the MFP 1. In this case, the CPU 24 switches the display of the display 13 from the logout confirmation screen 71 to the login reception screen 31.

When the "NO" selection button 73 is pressed by the operation of the operating interface 14, the logged-in user is not logged out from the MFP 1. In this case, the CPU 24 returns the display of the display 13 from the logout confirmation screen 71 to the function-execution in-progress screen 61.

<Login/Logout Process>

Figure 4:
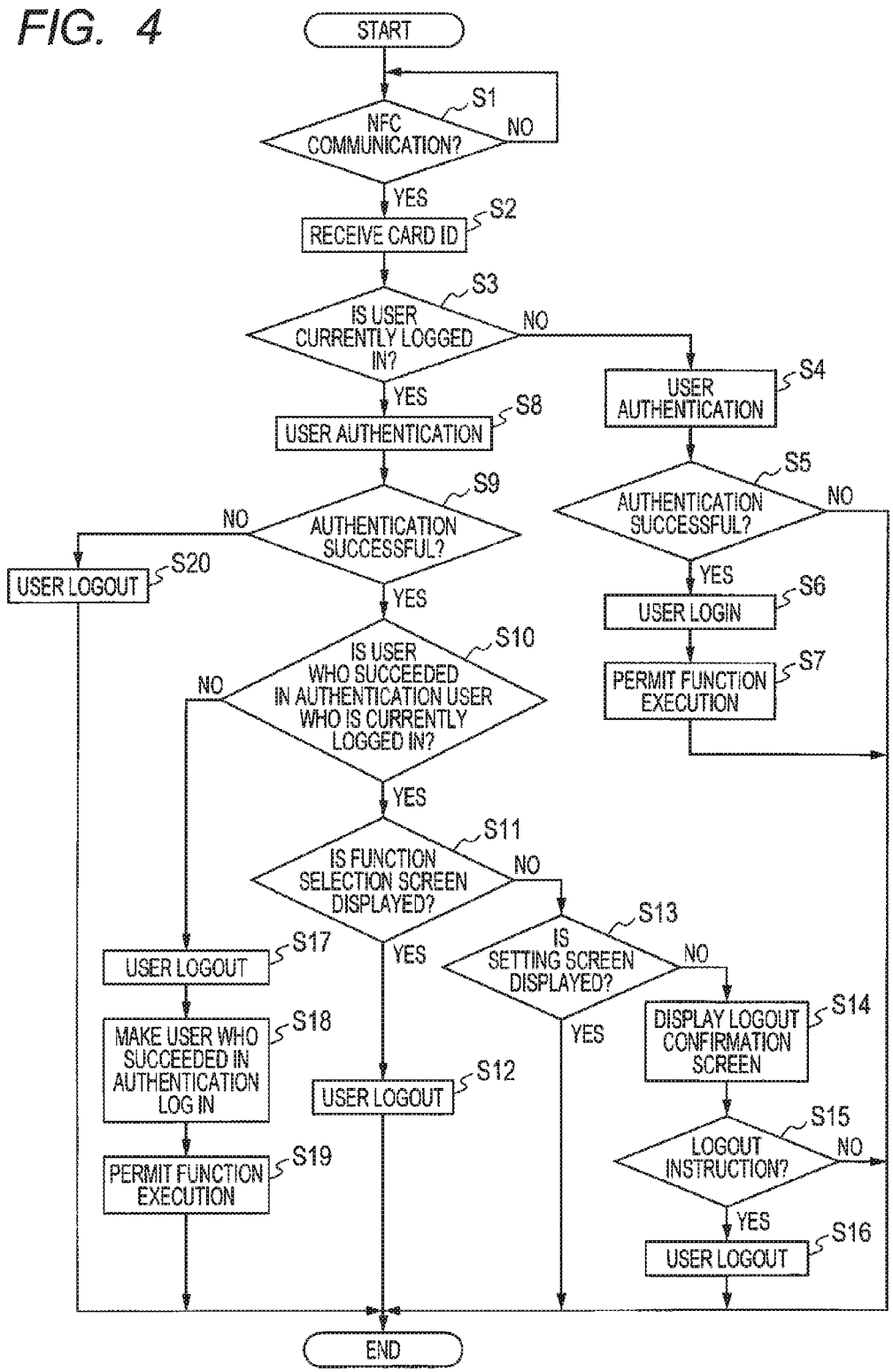
FIG. 4 is a flowchart showing a flow of a login/logout process.

For the login and the logout of the user, the CPU 24 performs the login/logout process shown in FIG. 4.

In the login/logout process, the processing (S2 to S18) described below is not performed (S1: NO) until the NFC communication between the IC card 2 and the NFC communication interface 15 is performed.

When the NFC communication between the IC card 2 and the NFC communication interface 15 is performed (S1: YES), the NFC communication interface 15 reads the card ID from the IC card 2. The CPU 24 receives the card ID read from the IC card 2 by the NFC communication interface 15 (S2: an example of identification information receiving process).

After that, the CPU 24 determines whether any of users having the use authority of the MFP 1 is logged in (hereinafter, this state is referred to as "during user login") (S3). Instead of this determination, whether the operation mode of the MFP 1 is the second mode may be determined. It can be determined that it is during the user login when the operation mode of the MFP 1 is the second mode, and it can be determined that it is not during the user login when the operation mode of the MFP 1 is not the second mode, that is, the first mode. Alternatively, it may be determined whether the user ID is stored in the RAM 23. In this case, when the user ID is stored in the RAM 23, it is determined that the operation mode of the MFP 1 is the second mode and it is during the user login. When the user ID is not stored in the RAM 23, it is determined that the operation mode of the MFP 1 is the first mode and it is not during the user login. Alternatively, it may be determined whether the login reception screen 31 (see FIG. 2) is displayed on the display 13. In this case, when the login reception screen 31 is not displayed on the display 13, it is determined that the operation mode of the MFP 1 is the second mode and it is the during the user login. When the login reception screen 31 is displayed on the display 13, it is determined that the operation mode of the MFP 1 is the first mode and it is not during the user login.

When it is not during the user login (S3: NO), that is, when none of the users having the use authority of the MFP 1 is logged in, the CPU 24 performs user authentication whether the card ID of the IC card 2 received from the NFC communication interface 15 is registered in the user authentication database of the nonvolatile memory 25 (S4).

Then, the CPU 24 determines whether the user authentication is successful (S5).

When the user authentication is successful (S5: YES), that is, when the card ID is registered in the user authentication database, the CPU 24 reads the user ID corresponding to the card ID from the user authentication database, stores the user ID in the RAM 23, switches the operation mode of the MFP 1 from the first mode to the second mode, and thereby making the user log in to the MFP 1 (S6: user login; an example of a first login process).

The CPU 24 refers to the user authentication database to check functions that can be executed by the user and that is stored in association with the user ID, permits the execution of the functions that can be performed (S7), and stores the permitted functions in the RAM 23.

Then, the CPU 24 once ends the login/logout process. However, after that, the CPU 24 performs the login/logout process again.

When the NFC communication between the IC card 2 and the NFC communication interface 15 is performed again (S1: YES), the CPU 24 determines whether it is during the user login (S3), after receiving the card ID (S2).

When it is during the user login (S3: YES), the CPU 24 performs the user authentication (S8).

When the user authentication is successful (S9: YES), the CPU 24 reads the user ID corresponding to the card ID from the user authentication database, and determines whether the user ID is the same as the user ID stored in the RAM 23 (S10). By this determination, it is determined whether the user who has succeeded in the user authentication is the logged-in user.

When the user who has succeeded in the user authentication is the logged-in user, that is, when the user ID corresponding to the card ID is the same as the user ID stored in the RAM 23 (S10: YES), the CPU 24 determines whether the function selection screen 41 is displayed on the display 13 (S11).

When the function selection screen 41 is displayed on the display 13 (S11: YES), the CPU 24 switches the operation mode of the MFP 1 from the second mode to the first mode, and deletes the user ID stored in the RAM 23 to make the user log out from the MFP 1 (S12: an example of a first logout process).

When the function selection screen 41 is not displayed on the display 13 (S11: NO), the CPU 24 determines whether the setting screen 51 is displayed on the display 13 (S13).

When the setting screen 51 is displayed on the display 13 (S13: YES), the CPU 24 does not delete the user ID stored in the RAM 23 and maintains the login of the logged-in user. The setting screen 51 is displayed on the display 13 when one of the facsimile selection button 33, the copy selection button 34, and the scan selection button 35 is selected in the function selection screen 41. Thus, it is considered that there is a high possibility that the IC card 2 of the logged-in user during the display of the setting screen 51 approaches the NFC communication interface 15 not by the logged-in user's intention. The logged-in user is not logged out and the login state is maintained, thereby suppressing a logout that the logged-in user does not intend.

When the setting screen 51 is not displayed on the display 13 and the function-execution in-progress screen 61 is displayed on the display 13 (S13: NO), the CPU 24 controls the display 13 to display the logout confirmation screen 71 (S14).

Then, the CPU 24 determines whether a logout instruction is inputted by pressing of the "YES" selection button 72 of the logout confirmation screen 71 (S15).

When the logout instruction is inputted (S15: YES), the CPU 24 switches the operation mode of the MFP 1 from the second mode to the first mode, and deletes the user ID stored in the RAM 23 to make the user log out from the MFP 1 (S16: an example of a third logout process).

When the "YES" selection button 72 of the logout confirmation screen 71 is not pressed and the "NO" selection button 73 is pressed, the logout instruction is not inputted (S15: NO). Thus, the CPU 24 does not delete the user ID stored in the RAM 23 and maintains the login of the logged-in user.

On the other hand, when the user who has succeeded in the user authentication is not the logged-in user and the user ID corresponding to the card ID is not the same as the user ID stored in the RAM 23 (S10: NO), the CPU 24 deletes the user ID stored in the RAM 23 to make the user log out from the MFP 1 (S17). When, while the user is logged-in, the IC card 2 of a user other than the logged-in user is held over the NFC communication interface 15, it is considered that there is no logged-in user near the NFC communication interface 15. Thus, the logged-in user is logged out to enable the other user to log in to the MFP 1 and perform the function of the MFP 1.

After that, the CPU 24 stores the user ID corresponding to the card ID in the RAM 23 to make the user to log in to the MFP 1 (S18: user login; an example of a second login process).

The CPU 24 refers to the user authentication database, checks the functions that can be executed by the user stored in association with the user ID, permits the execution of the function that can be performed (S19), and stores the permitted functions in the RAM 23.

When the user authentication performed in the login state is not successful and fails (S9: NO), the CPU 24 switches the operation mode of the MFP 1 from the second mode to the first mode, and deletes the user ID stored in the RAM 23 to make the user to log out from the MFP 1 (S20: an example of a second logout process).

<Operations and Effects>

As described above, when the IC card 2 approaches within a particular distance from the NFC communication interface 15, the wireless communication between the IC card 2 and the NFC communication interface 15 is performed and the card ID is read from the IC card 2 by the NFC communication interface 15. When this wireless communication is performed, the CPU 24 receives the card ID stored in the IC card 2 via the NFC communication interface 15.

In the nonvolatile memory 25, the user authentication database is constructed. In the user authentication database, the user ID is registered. When the operation mode of the MFP 1 at the time of receiving the card ID is the first mode in which the MFP 1 stands by, the CPU 24 determines whether the user ID corresponding to the card ID is registered in the user authentication database (whether the user ID is stored in the nonvolatile memory 25).

When the user ID corresponding to the card ID is registered in the user authentication database, the user ID corresponding to the card ID is stored in the RAM 23. The operation mode of the MFP 1 is switched from the first mode to the second mode. Thereby, the user who owns the IC card 2 that has approached the NFC communication interface 15 is logged in to the MFP 1. In the user authentication database, the user ID and the functions that can be executed by the user corresponding to the user ID are registered in association with each other. In response to the user login, the execution of the functions registered in the user authentication database in association with the user ID is permitted.

In the second mode, the function selection screen 41 is displayed on the display 13. In the function selection screen 41, one of the functions registered in the user authentication database in association with the user ID can be selected by the selection operation received by the operating interface 14. In response to that the operating interface 14 receives the operation of selecting the function during the display of the function selection screen 41, the setting screen 51 that is different from the function selection screen 41 is displayed on the display 13. Thus, a state where the function selection screen 41 is displayed is a state before the operation of selecting the function is received by the operating interface 14. Assume a situation that, in this state, the IC card 2 storing the card ID corresponding to the user ID stored in the RAM 23 approaches the NFC communication 15 again. This situation is considered that the user who owns the IC card 2 changes his/her mind and stops using the function before performing the operation of selecting the function. Therefore, when, during the display of the function selection screen 41, the IC card 2 storing the card ID corresponding to the user ID stored in the RAM 23 approaches the NFC communication interface 15 again and the card ID is read from the IC card 2 by the NFC communication interface 15, the operation mode of the MFP 1 is switched from the second mode to the first mode and the user ID stored in the RAM 23 is deleted. Thereby, the logged-in user is logged out from the MFP 1.

When the operating interface 14 receives the operation of selecting the function during the display of the function selection screen 41, the display on the display 13 is switched from the function selection screen 41 to the setting screen 51. Because the operation of selecting the function is performed, it is considered that the user who has held the IC card 2 close to the NFC communication interface 15 before the display of the function selection screen 41 has intention to perform the function. Thus, when the card ID corresponding to the user ID stored in the RAM 23 is read from the IC card 2 by the NFC communication interface 15 during the display of a screen other than the function selection screen 41, such as during the display of the setting screen 51, it is considered that there is a high possibility that the reading is not executed by intention of the user who owns the IC card 2. Thus, when the card ID corresponding to the user ID stored in the RAM 23 is read from the IC card 2 by the NFC communication interface 15 during the display of the setting screen 51, the user ID stored in the RAM 23 is not deleted and the second mode is maintained. This suppresses the operation mode of the MFP 1 from switching from the second mode to the first mode, that is, the logout from the MFP 1, at an unintended timing for the user.

In the second mode, when the IC card 2 storing the other card ID than the card ID corresponding to the user ID stored in the RAM 23 approaches the NFC communication interface 15 and the card ID is read from the IC card 2 by the NFC communication interface 15, it is considered that a user who owns the IC card 2 storing the card ID corresponding to the user ID stored in the RAM 23 is not located near the MFP 1. Thus, the operation mode of the MFP 1 is switched from the second mode to the first mode, and the user ID stored in the RAM 23 is deleted. Thereby, the logged-in user is logged out from the MFP 1. This suppresses the login state of a logged-in user from being maintained when the user is not near the MFP 1.

When the user ID corresponding to the card ID read from the IC card 2 is registered in the user authentication database, the user ID is written in the RAM 23, the operation mode of the MFP 1 is switched from the first mode to the second mode, and a user who owns the IC card 2 that has approached the NFC communication interface 15 is newly logged in to the MFP 1. Thereby, after the logout of the user who is far away from the MFP 1, another user can log in to the MFP 1 without an operation by the other user. Accordingly, the operability of the MFP 1 can be improved.

In the second mode, in response to that the operating interface 14 receives the operation of instructing the execution of the function during the display of the setting screen 51, the function-execution in-progress screen 61 is displayed on the display 13. In a state where the setting screen 51 is not displayed on the display 13 and the function-execution in-progress screen 61 is displayed on the display 13, when the IC card 2 approaches the NFC communication interface 15, the card ID is read from the IC card 2 by the NFC communication interface 15, and the user ID corresponding to the card ID is stored in the RAM 23, and the logout confirmation screen 71 for checking whether to switch the operation mode from the second mode to the first mode is displayed on the display 13.

When the operating interface 14 receives an operation of switching the operation mode to the first mode during the display of the logout confirmation screen 71, the operation mode of the MFP 1 is switched from the second mode to the first mode, and the user ID stored in the RAM 23 is deleted. On the other hand, when the operating interface 14 receives an operation of maintaining the operation mode in the second mode during the display of the logout confirmation screen 71, the operation mode of the MFP 1 is maintained in the second mode.

Accordingly, the user can be prevented from being logged out from the MFP 1 at an unintended timing for the user, while the logged-in user can be logged out from the MFP 1 when the user intends to log out.

<Guest Login/Logout Process>

Figure 5:
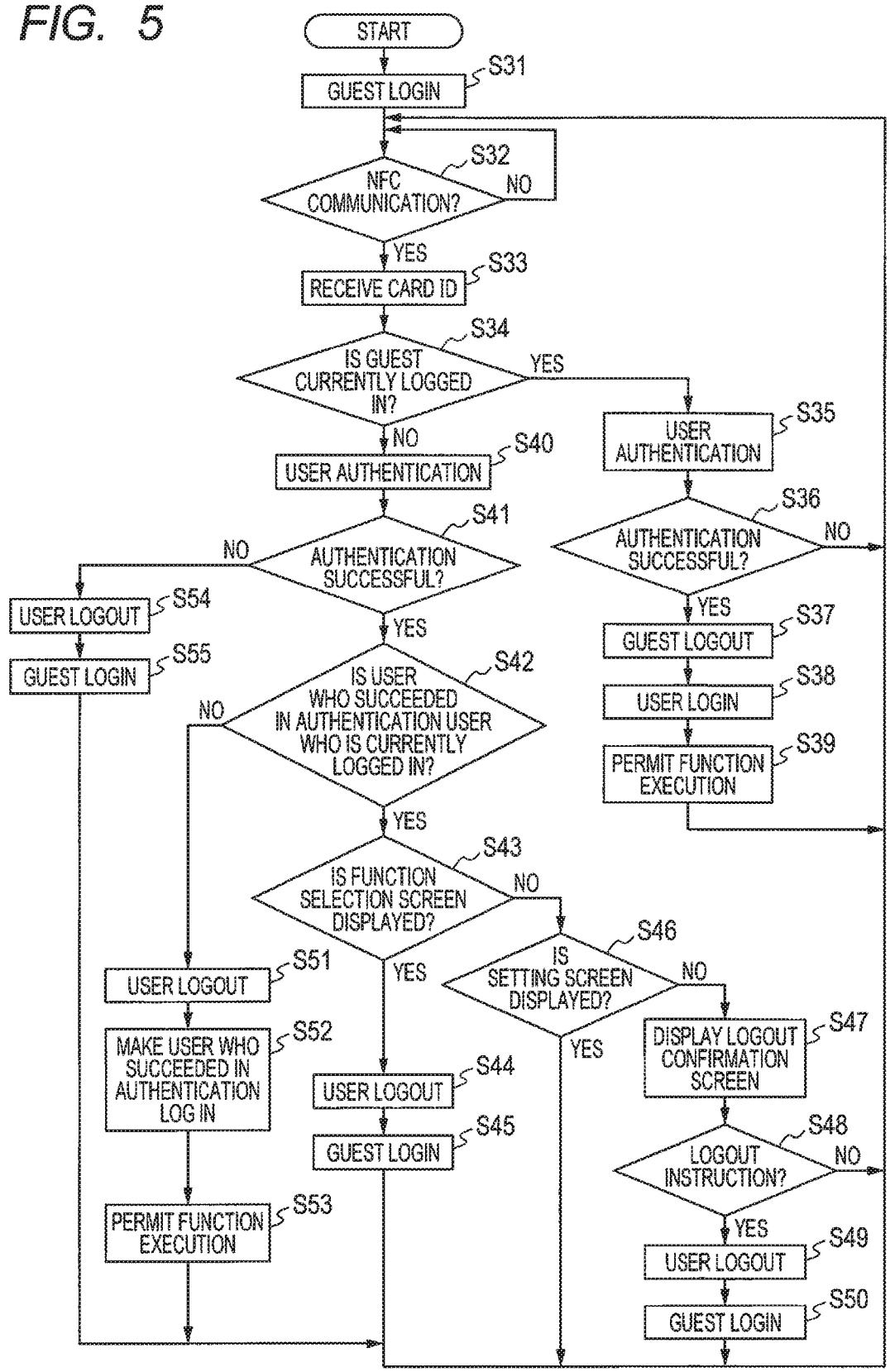
FIG. 5 is a flowchart showing a flow of a guest login/logout process.

In a state where none of users having the use authority of the MFP 1 is logged in to the MFP 1, execution of a specific part of functions by a person (hereinafter, referred to as "guest") other than the user having the use authority of the MFP 1 may be permitted. This process improves convenience of the MFP 1 for the guest. When this process is adopted, the CPU 24 may perform a guest login/logout process shown in FIG. 5 instead of the login/logout process shown in FIG. 4.

In a state where the execution of the specific part of functions by a guest is permitted, the operation mode of the MFP 1 is the first mode. During the user login (a state where any of the users having the use authority of the MFP 1 is logged in, the operation mode of the MFP 1 is the second mode.

When power of the MFP 1 is inputted, the guest login/logout process is performed. At the start of the guest login/logout process, none of users is logged in. Thus, the CPU 24 stores a guest ID in the RAM 23 to make a guest virtually log in (S31: guest login). In the user authentication database constructed in the nonvolatile memory 25, as shown in FIG. 3, the guest ID "Guest" corresponding to a guest is registered, and specific functions that can be executed by a guest are stored in association with the guest ID "Guest". In an example shown in FIG. 3, only the scan function is stored as the specific function that can be executed by a guest. The CPU 24 makes a guest log in, and then permits the execution of the function that can be executed by the guest, and stores the permitted function in the RAM 23.

After that, when the NFC communication between the IC card 2 and the NFC communication interface 15 is performed (S32: YES), the CPU 24 receives the card ID stored in the IC card 2 via the NFC communication interface 15 (S33: an example of the identification information receiving process).

After that, the CPU 24 determines whether a guest is logged in (hereinafter, this state is referred to as "during guest login") (S34).

When it is during the guest login (S34: YES), that is, when the guest ID is stored in the RAM 23, the CPU 24 performs the user authentication whether the card ID of the IC card 2 is registered in the user authentication database of the nonvolatile memory 25 (S35).

Then, the CPU 24 determines whether the user authentication is successful (S36).

When the user authentication is successful (S36: YES), that is, when the card ID is registered in the user authentication database, the CPU 24 deletes the guest ID from the RAM 23 and makes the virtually logged-in guest log out (S37).

After the logout of the guest, the CPU 24 reads the user ID corresponding to the card ID from the user authentication database, stores the user ID in the RAM 23, switches the operation mode of the MFP 1 from the first mode to the second mode, and thereby making the user log in to the MFP 1 (S38: an example of the first login process).

The CPU 24 refers to the user authentication database, checks the function that can be executed by the user stored in association with the user ID, permits the execution of the function that can be performed (S39), and stores the permitted function in the RAM 23.

After that, when the NFC communication between the IC card 2 and the NFC communication interface 15 is performed again (S32: YES), the CPU 24 determines, after receiving the card ID (S33), whether it is during the guest login (S34).

When it is not during the guest login (S34: NO), that is, when it is during the user login, the CPU 24 performs the user authentication (S40).

When the user authentication is successful (S41: YES), the CPU 24 reads the user ID corresponding to the card ID from the user authentication database, and determines whether the user ID is the same as the user ID stored in the RAM 23 (S42). By this determination, it is determined whether the user who has succeeded in the user authentication is the logged-in user.

When the user who has succeeded in the user authentication is the logged-in user, that is, when the user ID corresponding to the card ID is the same as the user ID stored in the RAM 23 (S42: YES), the CPU 24 determines whether the function selection screen 41 is displayed on the display 13 (S43).

When the function selection screen 41 is displayed on the display 13 (S43: YES), the CPU 24 switches the operation mode of the MFP 1 from the second mode to the first mode, and deletes the user ID stored in the RAM 23 to make the user log out from the MFP 1 (S44: an example of the first logout process).

After that, the CPU 24 stores the guest ID in the RAM 23 and makes a guest virtually log in (S45). Then, the CPU 24 permits the execution of the function that can be executed by the guest and stores the permitted function in the RAM 23.

When the function selection screen 41 is not displayed on the display 13 (S43: NO), the CPU 24 determines whether the setting screen 51 is displayed on the display 13 (S46).

When the setting screen 51 is displayed on the display 13 (S46: YES), the CPU 24 does not make the logged-in user log out and maintains the login of the logged-in user.

When the setting screen 51 is not displayed on the display 13 and the function-execution in-progress screen 61 is displayed on the display 13 (S46: NO), the CPU 24 controls the display 13 to display the logout confirmation screen 71 (S47).

The CPU 24 determines whether a logout instruction is inputted by pressing of the "YES" selection button 72 of the logout confirmation screen 71 (S48).

When the logout instruction is inputted (S48: YES), the CPU 24 switches the operation mode of the MFP 1 from the second mode to the first mode, and deletes the user ID stored in the RAM 23 to make the user log out from the MFP 1 (S49: an example of the third logout process).

After that, the CPU 24 stores the guest ID in the RAM 23 and makes the guest virtually log in (S50). Then, the CPU 24 permits the execution of the function that can be executed by the guest and stores the permitted function in the RAM 23.

When the "YES" selection button 72 of the logout confirmation screen 71 is not pressed and the "NO" selection button 73 is pressed, the logout instruction is not inputted (S48: NO). Thus, the CPU 24 does not make the logged-in user log out and maintains the login of the logged-in user.

On the other hand, when the user who has succeeded in the user authentication is not the logged-in user, that is, when the user ID corresponding to the card ID is not the same as the user ID stored in the RAM 23 (S42: NO), the CPU 24 deletes the user ID stored in the RAM 23 to make the user log out from the MFP 1 (S51).

After that, the CPU 24 stores the user ID corresponding to the card ID in the RAM 23 to make the user log in to the MFP 1 (S52: an example of the second login process).

The CPU 24 refers to the user authentication database, checks the function that can be executed by the user stored in association with the user ID, permits the execution of the function that can be performed (S53), and stores the permitted function in the RAM 23.

When the user authentication performed in the login state is not successful and fails (S41: NO), the CPU 24 switches the operation mode of the MFP 1 from the second mode to the first mode, and deletes the user ID stored in the RAM 23 to make the user log out from the MFP 1 (S54: an example of the second logout process).

After that, the CPU 24 stores the guest ID in the RAM 23 and makes a guest virtually log in (S55). Then, the CPU 24 permits the execution of the function that can be executed by the guest and stores the permitted function in the RAM 23.

<Modifications>

While the disclosure has been described in detail with reference to the above aspects thereof, it would be apparent to those skilled in the art that various changes and modifications may be made therein without departing from the scope of the claims.

Figure 6:
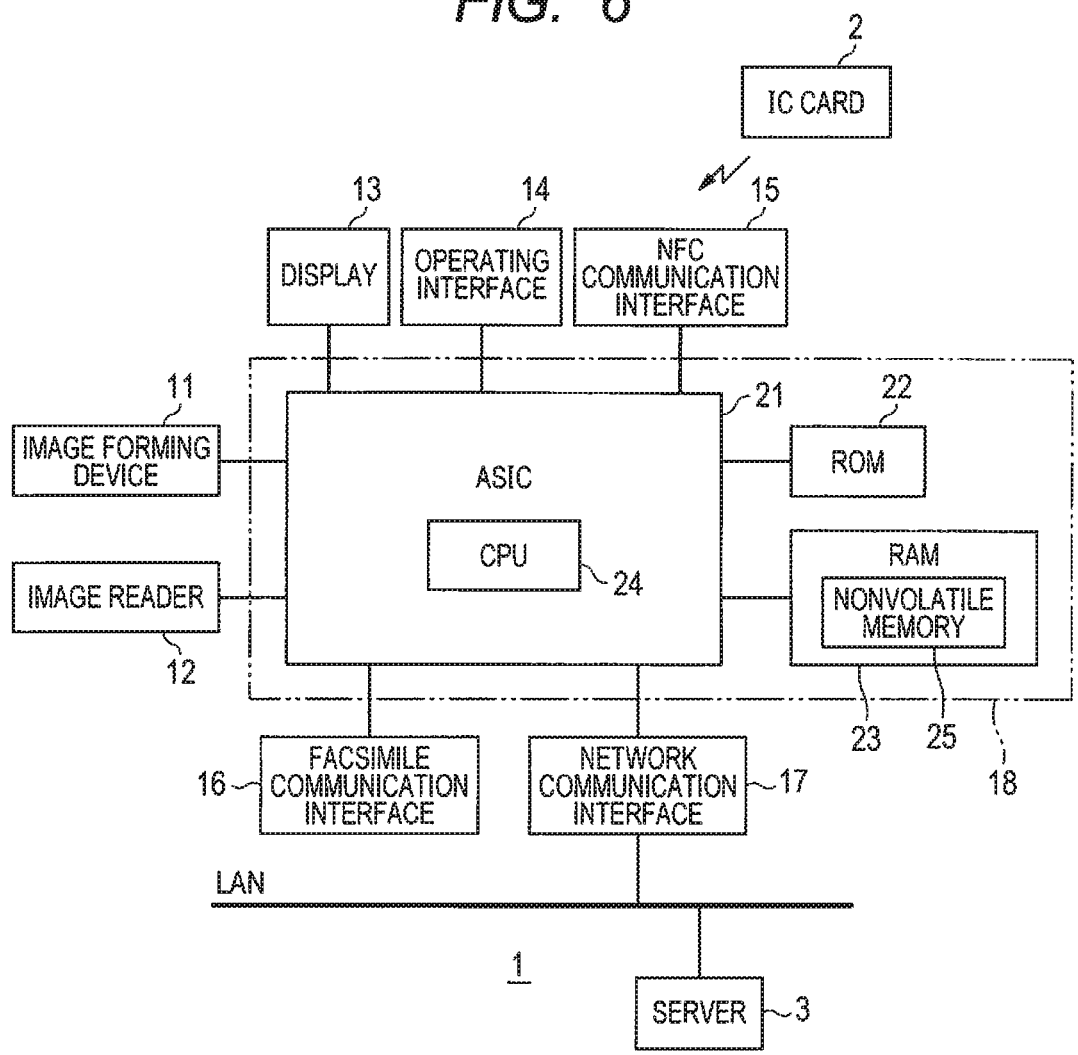
FIG. 6 is a block diagram showing a system configuration including the MFP according to a modification.

For example, as shown in FIG. 6, when a server 3 is connected to the MFP 1 via a LAN, the server 3, not the nonvolatile memory 25 may store the user authentication database constructed by associating the user having the use authority of the MFP 1, the card ID of the IC card 2 of the user, and the function that can be executed by the user. In this case, the server 3 may perform user authentication of determining whether the card ID read from the IC card 2 is stored in the user authentication database.

In a configuration in which the server 3 can perform user authentication, an external authentication function that is user authentication by the server 3 may be set to ON/OFF (enabled/disabled). In this case, when the power of the MFP 1 is inputted and when operation of switching ON/OFF of the external authentication function is performed, the CPU 24 performs a process shown in FIG. 7.

Figure 7:
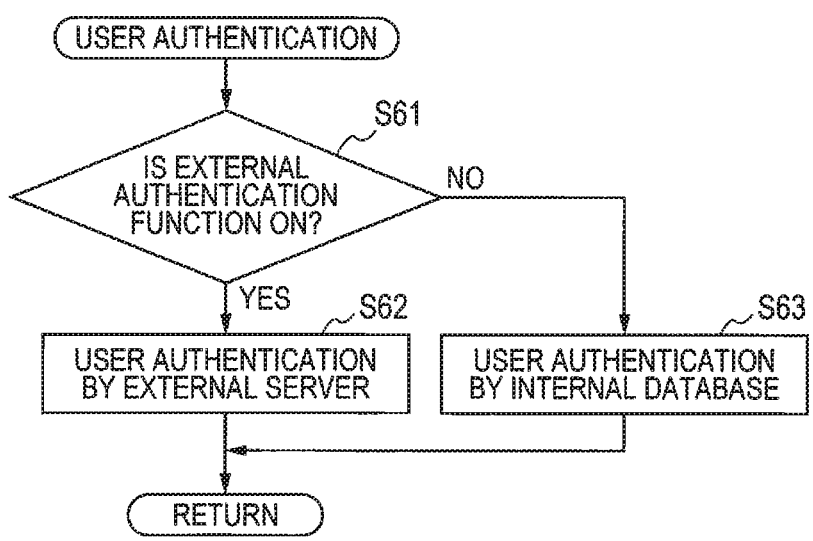
FIG. 7 is a flowchart showing a flow of processing performed in the MFP shown in FIG. 6.

In the process shown in FIG. 7, the CPU 24 determines whether the external authentication function is ON (S61).

When the external authentication function is set to ON (S61: YES), the CPU 24 determines that the user authentication is executed by the outside server 3 (S62). In this case, in the user authentication, the CPU 24 transmits the card ID read from the IC card 2 from the network communication interface 17 to the server 3.

When the external authentication function is set to OFF (S61: NO), the CPU 24 determines that the user authentication is executed by the user authentication database stored in the nonvolatile memory 25 (S63).

In the above-described embodiment, the CPU 24 executes each process. However, the ASIC 21 may include a plurality of CPUs and the plurality of CPUs may execute each process in cooperation with each other.

In the above-described embodiment, the user authentication database is stored in the nonvolatile memory 25 (an example of a first memory). When user authentication is successful, the user ID is stored in the RAM 23 (an area other than the nonvolatile memory 25; an example of a second memory). The program of the login/logout process is stored in the ROM 22 (an example of a third memory). In this way, these information may be stored in different memories. Alternatively, these information may be stored in different areas of the same memory. For example, all or part of the user authentication database, the user ID, and the program of the login/logout process may be stored in the nonvolatile memory 25.

What is claimed is:

1. An image processing apparatus comprising:
a first memory for storing first identification information;
a wireless communication interface configured to perform wireless communication with a noncontact storage medium located within a particular distance and to receive second identification information;
a second memory for storing third identification information;
an operating interface configured to receive an operation;
a display;
a processor; and
a third memory storing instructions, the instructions, when executed by the processor, causing the processor to perform:
switching an operating mode of the image processing apparatus between:
a first mode in which the image processing apparatus stands by; and
a second mode in which the processor executes a first displaying process of displaying a first screen on the display, and a second displaying process of displaying a second screen different from the first screen on the display in response to receiving, by the operating interface, an operation relating to a function using image data while the first screen is being displayed;
when wireless communication is performed between the noncontact storage medium and the wireless communication interface, executing an identification information receiving process of receiving the second identification information stored in the noncontact storage medium through the wireless communication interface;
in a case where the operating mode is the first mode when the identification information receiving process is executed,
determining whether the first memory stores the first identification information corresponding to the second identification information;
in response to determining that the first memory stores the first identification information corresponding to the second identification information, storing the third identification information corresponding to the second identification information in the second memory, and executing a first login process of switching the operating mode from the first mode to the second mode; and
in response to determining that the first memory does not store the first identification information corresponding to the second identification information, maintaining the operating mode in the first mode without executing the first login process; and
in a case where the operating mode is the second mode when the identification information receiving process is executed,
determining whether the first memory stores the first identification information corresponding to the second identification information;
in response to determining that the first memory stores the first identification information corresponding to the second identification information, determining whether the second memory stores the third identification information corresponding to the second identification information;
in response to determining that the second memory stores the third identification information corresponding to the second identification information, determining whether the first screen is displayed on the display;
in response to determining that the first screen is displayed on the display, executing a first logout process of switching the operating mode from the second mode to the first mode and deleting the third identification information stored in the second memory;
in response to determining that the first screen is not displayed on the display, maintaining the operating mode in the second mode without executing the first logout process;
in response to determining that the second memory does not store the third identification information corresponding to the second identification information, executing a second login process of storing the third identification information corresponding to the second identification information in the second memory; and
in response to determining that the first memory does not store the first identification information corresponding to the second identification information, executing a second logout process of switching the operating mode from the second mode to the first mode and deleting the third identification information stored in the second memory.

2. The image processing apparatus according to claim 1, wherein the instructions, when executed by the processor, cause the processor to perform:
in response to receiving, by the operating interface, an operation instructing execution of the function while the second screen is being displayed in the second mode, executing a third displaying process of displaying, on the display, a third screen different from both of the first screen and the second screen;

in a case where the operating mode is the second mode when the second identification information receiving process is executed, where the first memory stores the first identification information corresponding to the second identification information, where the second memory stores the third identification information corresponding to the first identification information, and where the first screen is not displayed on the display, determining whether the second screen is displayed on the display;

when the second screen is displayed on the display, maintaining the operating mode in the second mode without executing the first logout process;

when the second screen is not displayed on the display and the third screen is displayed on the display, displaying, on the display, a fourth screen for confirming whether to switch the operating mode to the first mode;

in response to receiving, by the operating interface, an operation of switching the operating mode to the first mode while the fourth screen is being displayed, executing a third logout process of switching the operating mode from the second mode to the first mode and deleting the third identification information stored in the second memory; and in response to receiving, by the operating interface, an operation of maintaining the operating mode in the second mode while the fourth screen is being displayed, maintaining the operating mode in the second mode without executing the third logout process.

3. The image processing apparatus according to claim 1, wherein the instructions, when executed by the processor, cause the processor to perform:

in the second login process, after switching the operating mode from the second mode to the first mode and deleting the third identification information stored in the second memory, storing the third identification information corresponding to the first identification information in the second memory and subsequently switching the operating mode from the first mode to the second mode.

4. The image processing apparatus according to claim 1, wherein the instructions, when executed by the processor, cause the processor to perform:

when the operating mode is the second mode, receiving, by the operating interface, an operation of instructing execution of a particular function out of the function using image data, without receiving the operation of instructing execution of the particular function when the operating mode is the first mode.

5. The image processing apparatus according to claim 1, wherein the image processing apparatus is configured to execute a plurality of functions;

wherein the first memory stores the first identification information and an executable function in association with each other, the executable function being executable when the second memory stores the third identification information corresponding to the first identification information; and wherein the instructions, when executed by the processor, cause the processor to perform:

in response to storing the third identification information in the second memory, permitting execution of the executable function stored in the first memory in association with the first identification information.

6. The image processing apparatus according to claim 5, wherein the first screen is a screen for selecting, by a selection operation received by the operating interface, one of the executable function stored in the first memory in association with the third identification information stored in the second memory.

7. The image processing apparatus according to claim 1, wherein the function includes an image forming function of forming an image on a sheet.

8. The image processing apparatus according to claim 1, wherein the image processing apparatus is configured to execute a plurality of functions; and wherein the instructions, when executed by the processor, cause the processor to perform a guest login process of making a guest virtually log in to the image processing apparatus to permit the guest to execute a specific part of the plurality of functions.

9. The image processing apparatus according to claim 1, further comprising a function execution device configured to execute the function using image data, the function execution device including at least one of a printer, a scanner, and a facsimile communication interface.

10. A method executable on an image processing apparatus including: a first memory for storing first identification information; a wireless communication interface configured to perform wireless communication with a noncontact storage medium located within a particular distance and to receive second identification information; a second memory for storing third identification information; an operating interface configured to receive an operation; a display; and a processor configured to perform: switching an operating mode of the image processing apparatus between: a first mode in which the image processing apparatus stands by; and a second mode in which the processor executes a first displaying process of displaying a first screen on the display, and a second displaying process of displaying a second screen different from the first screen on the display in response to receiving, by the operating interface, an operation relating to a function using image data while the first screen is being displayed, the method comprising:

when wireless communication is performed between the noncontact storage medium and the wireless communication interface, executing an identification information receiving process of receiving the second identification information stored in the noncontact storage medium through the wireless communication interface;

in a case where the operating mode is the first mode when the identification information receiving process is executed, determining whether the first memory stores the first identification information corresponding to the second identification information;

in response to determining that the first memory stores the first identification information corresponding to the second identification information, storing the third identification information corresponding to the second identification information in the second memory, and executing a first login process of switching the operating mode from the first mode to the second mode; and in response to determining that the first memory does not store the first identification information corresponding to the second identification information, maintaining the operating mode in the first mode without executing the first login process; and in a case where the operating mode is the second mode when the identification information receiving process is executed,
  determining whether the first memory stores the first identification information corresponding to the second identification information;
  in response to determining that the first memory stores the first identification information corresponding to the second identification information, determining whether the second memory stores the third identification information corresponding to the second identification information;
   in response to determining that the second memory stores the third identification information corresponding to the second identification information, determining whether the first screen is displayed on the display;
   in response to determining that the first screen is displayed on the display, executing a first logout process of switching the operating mode from the second mode to the first mode and deleting the third identification information stored in the second memory;
   in response to determining that the first screen is not displayed on the display, maintaining the operating mode in the second mode without executing the first logout process;
   in response to determining that the second memory does not store the third identification information corresponding to the second identification information, executing a second login process of storing the third identification information corresponding to the second identification information in the second memory; and
  in response to determining that the first memory does not store the first identification information corresponding to the second identification information, executing a second logout process of switching the operating mode from the second mode to the first mode and deleting the third identification information stored in the second memory.

11. The method according to claim 10, further comprising:
in response to receiving, by the operating interface, an operation instructing execution of the function while the second screen is being displayed in the second mode, executing a third displaying process of displaying, on the display, a third screen different from both of the first screen and the second screen;
in a case where the operating mode is the second mode when the second identification information receiving process is executed, where the first memory stores the first identification information corresponding to the second identification information, where the second memory stores the third identification information corresponding to the first identification information, and where the first screen is not displayed on the display, determining whether the second screen is displayed on the display;
when the second screen is displayed on the display, maintaining the operating mode in the second mode without executing the first logout process;
when the second screen is not displayed on the display and the third screen is displayed on the display, displaying, on the display, a fourth screen for confirming whether to switch the operating mode to the first mode;
in response to receiving, by the operating interface, an operation of switching the operating mode to the first mode while the fourth screen is being displayed, executing a third logout process of switching the operating mode from the second mode to the first mode and deleting the third identification information stored in the second memory; and
in response to receiving, by the operating interface, an operation of maintaining the operating mode in the second mode while the fourth screen is being displayed, maintaining the operating mode in the second mode without executing the third logout process.

12. The method according to claim 10, further comprising:
in the second login process, after switching the operating mode from the second mode to the first mode and deleting the third identification information stored in the second memory, storing the third identification information corresponding to the first identification information in the second memory and subsequently switching the operating mode from the first mode to the second mode.

13. The method according to claim 10, further comprising:
when the operating mode is the second mode, receiving, by the operating interface, an operation of instructing execution of a particular function out of the function using image data, without receiving the operation of instructing execution of the particular function when the operating mode is the first mode.

14. The method according to claim 10, wherein the image processing apparatus is configured to execute a plurality of functions;
wherein the first memory stores the first identification information and an executable function in association with each other, the executable function being executable when the second memory stores the third identification information corresponding to the first identification information; and
wherein the method further comprises:
in response to storing the third identification information in the second memory, permitting execution of the executable function stored in the first memory in association with the first identification information.

15. The method according to claim 14, wherein the first screen is a screen for selecting, by a selection operation received by the operating interface, one of the executable function stored in the first memory in association with the third identification information stored in the second memory.

16. The method according to claim 10, wherein the function includes an image forming function of forming an image on a sheet.

17. A non-transitory computer-readable storage medium storing a set of program instructions executable by a computer of an image processing apparatus, the image processing apparatus including: a first memory for storing first identification information; a wireless communication interface configured to perform wireless communication with a noncontact storage medium located within a particular distance and to receive second identification information; a second memory for storing third identification information; an operating interface configured to receive an operation; and a display,
the set of program instructions comprising:
switching an operating mode of the image processing apparatus between:

a first mode in which the image processing apparatus stands by; and a second mode in which the processor executes a first displaying process of displaying a first screen on the display, and a second displaying process of displaying a second screen different from the first screen on the display in response to receiving, by the operating interface, an operation relating to a function using image data while the first screen is being displayed;

when wireless communication is performed between the noncontact storage medium and the wireless communication interface, executing an identification information receiving process of receiving the second identification information stored in the noncontact storage medium through the wireless communication interface;

in a case where the operating mode is the first mode when the identification information receiving process is executed, determining whether the first memory stores the first identification information corresponding to the second identification information;

in response to determining that the first memory stores the first identification information corresponding to the second identification information, storing the third identification information corresponding to the second identification information in the second memory, and executing a first login process of switching the operating mode from the first mode to the second mode; and in response to determining that the first memory does not store the first identification information corresponding to the second identification information, maintaining the operating mode in the first mode without executing the first login process; and in a case where the operating mode is the second mode when the identification information receiving process is executed, determining whether the first memory stores the first identification information corresponding to the second identification information;

in response to determining that the first memory stores the first identification information corresponding to the second identification information, determining whether the second memory stores the third identification information corresponding to the second identification information;

in response to determining that the second memory stores the third identification information corresponding to the second identification information, determining whether the first screen is displayed on the display;

in response to determining that the first screen is displayed on the display, executing a first logout process of switching the operating mode from the second mode to the first mode and deleting the third identification information stored in the second memory;

in response to determining that the first screen is not displayed on the display, maintaining the operating mode in the second mode without executing the first logout process;

in response to determining that the second memory does not store the third identification information corresponding to the second identification information, executing a second login process of storing the third identification information corresponding to the second identification information in the second memory; and in response to determining that the first memory does not store the first identification information corresponding to the second identification information, executing a second logout process of switching the operating mode from the second mode to the first mode and deleting the third identification information stored in the second memory.

18. The non-transitory computer-readable storage medium according to claim 17, wherein the set of program instructions further comprises:

in response to receiving, by the operating interface, an operation instructing execution of the function while the second screen is being displayed in the second mode, executing a third displaying process of displaying, on the display, a third screen different from both of the first screen and the second screen;

in a case where the operating mode is the second mode when the second identification information receiving process is executed, where the first memory stores the first identification information corresponding to the second identification information, where the second memory stores the third identification information corresponding to the first identification information, and where the first screen is not displayed on the display, determining whether the second screen is displayed on the display;

when the second screen is displayed on the display, maintaining the operating mode in the second mode without executing the first logout process;

when the second screen is not displayed on the display and the third screen is displayed on the display, displaying, on the display, a fourth screen for confirming whether to switch the operating mode to the first mode;

in response to receiving, by the operating interface, an operation of switching the operating mode to the first mode while the fourth screen is being displayed, executing a third logout process of switching the operating mode from the second mode to the first mode and deleting the third identification information stored in the second memory; and in response to receiving, by the operating interface, an operation of maintaining the operating mode in the second mode while the fourth screen is being displayed, maintaining the operating mode in the second mode without executing the third logout process.

19. The non-transitory computer-readable storage medium according to claim 17, wherein the set of program instructions further comprises:

in the second login process, after switching the operating mode from the second mode to the first mode and deleting the third identification information stored in the second memory, storing the third identification information corresponding to the first identification information in the second memory and subsequently switching the operating mode from the first mode to the second mode.

20. The non-transitory computer-readable storage medium according to claim 17, wherein the set of program instructions further comprises:

when the operating mode is the second mode, receiving, by the operating interface, an operation of instructing execution of a particular function out of the function using image data, without receiving the operation of instructing execution of the particular function when the operating mode is the first mode.

\* \* \* \* \*